March 25, 1924. 1,488,381

J. H. CHAMBERS

CHANGE SPEED GEAR FOR SELF PROPELLED VEHICLES

Filed Jan. 27, 1921 3 Sheets-Sheet 1

INVENTOR
J. H. Chambers,
BY Marks & Clerk
ATTORNEYS

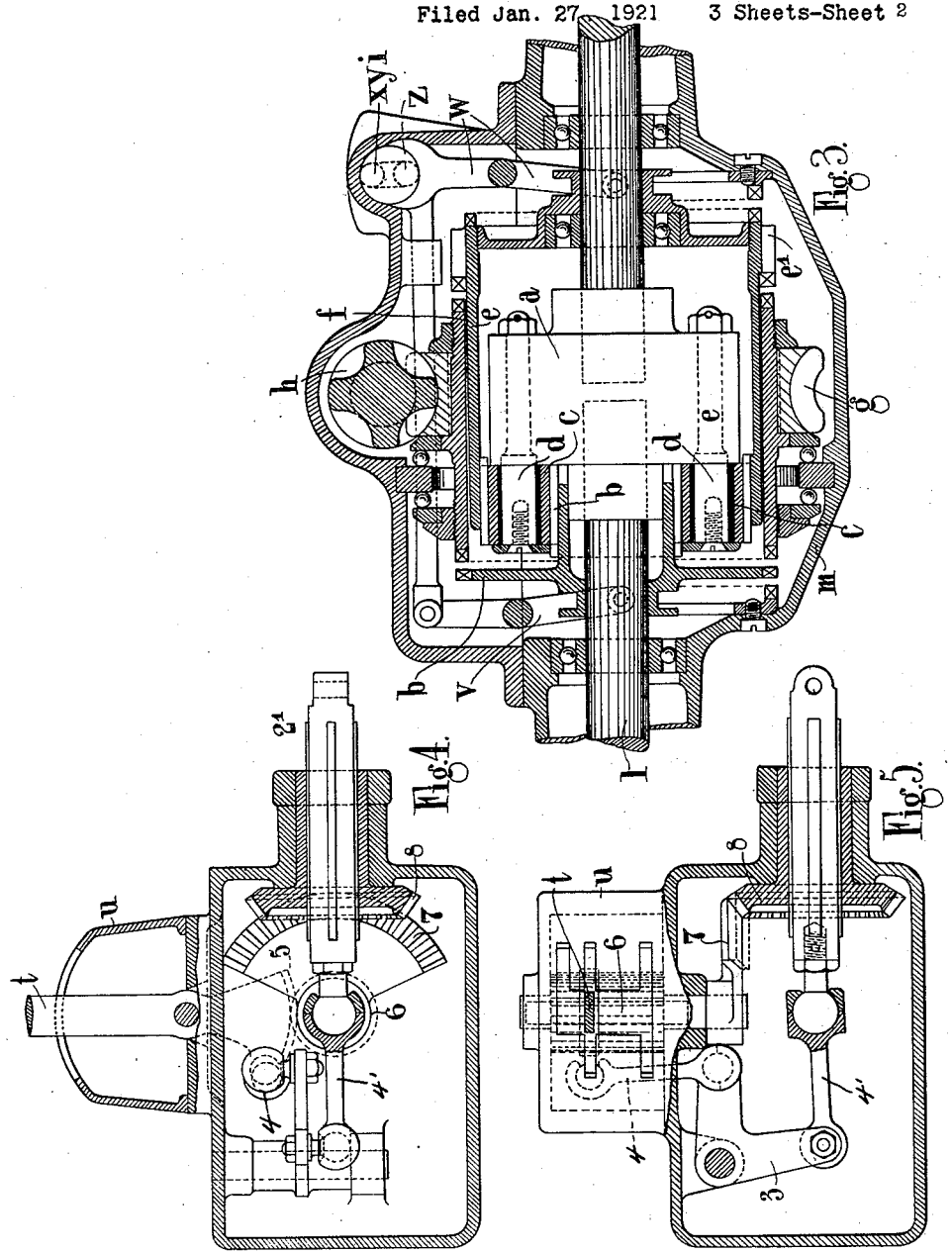

March 25, 1924. 1,488,381
J. H. CHAMBERS
CHANGE SPEED GEAR FOR SELF PROPELLED VEHICLES
Filed Jan. 27, 1921  3 Sheets-Sheet 3

INVENTOR
J. H. Chambers,
BY Marks & Clerk
ATTORNEYS

Patented Mar. 25, 1924.

1,488,381

UNITED STATES PATENT OFFICE.

JOHN HENRY CHAMBERS, OF BELFAST, IRELAND.

CHANGE-SPEED GEAR FOR SELF-PROPELLED VEHICLES.

Application filed January 27, 1921. Serial No. 440,460.

(GRANTED UNDER THE PROVISIONS OF THE ACT OF MARCH 3, 1921, 41 STAT. L., 1313.)

*To all whom it may concern:*

Be it known that I, JOHN HENRY CHAMBERS, a subject of the King of Great Britain and Ireland, and residing at 5 Sandown Park, Belfast, Ireland, have invented certain new and useful Improvements in Change-Speed Gears for Self-Propelled Vehicles (for which I have filed application in Great Britain No. 28,065, dated 12th November, 1919, Patent No. 161,613), of which the following is a specification.

This invention relates to change speed gear for self-propelled vehicles of the type in which an epicyclic train is employed comprising an encircling driving member with the epicyclic gear arranged internally thereof.

The object of the present invention is to improve the construction and arrangement of change speed gear of the above type by which additional speeds may be given as compared with gears of this type as hitherto constructed while at the same time the gear will be of compact and strong construction easily encased for cleanliness and thorough lubrication and without the disadvantages of long concentric sleeves which are usually met with in gears of the above type.

The invention consists in change speed gear of the type referred to comprising an external gear or gears adapted to engage with one or other of the members of the epicyclic train in order to give changes of speed additional to those given by the epicyclic train itself, or a reverse.

The invention also consists in change speed gear of the above character in which either the sun wheel or an annular wheel or ring member forming part of the epicyclic train may be clutched and declutched from the encircling member.

The invention also consists in further details and arrangements hereinafter more particularly referred to.

The accompanying drawings illustrate two modes of carrying out the invention.

Figure 3 is a longitudinal sectional elevation line 3—3 of Fig. 1;

Figures 4 and 5 are views illustrating a gate change mechanism for controlling the gear;

Figure 1:
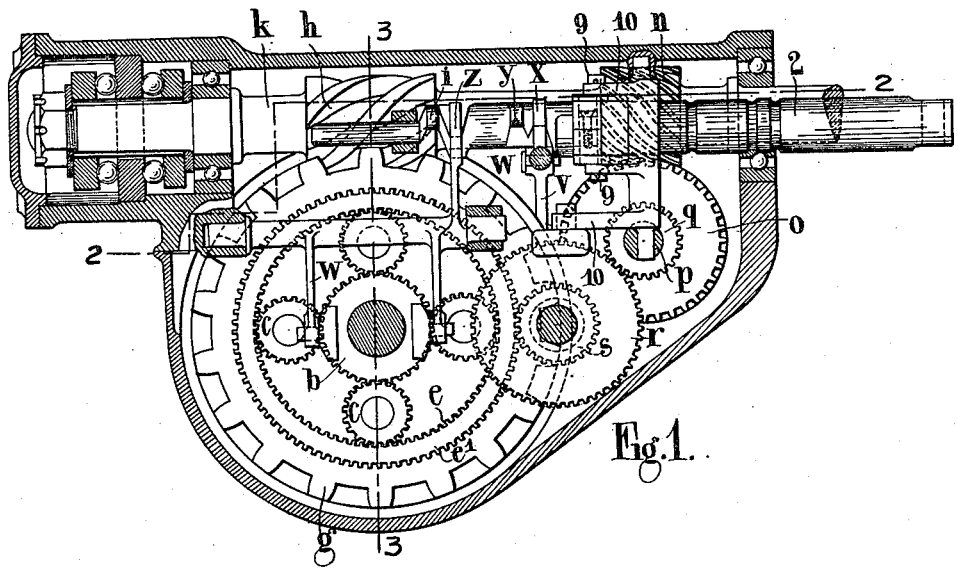
Figure 1 is a cross-sectional elevation showing one convenient form of gear in accordance with the invention.
Figure 2:
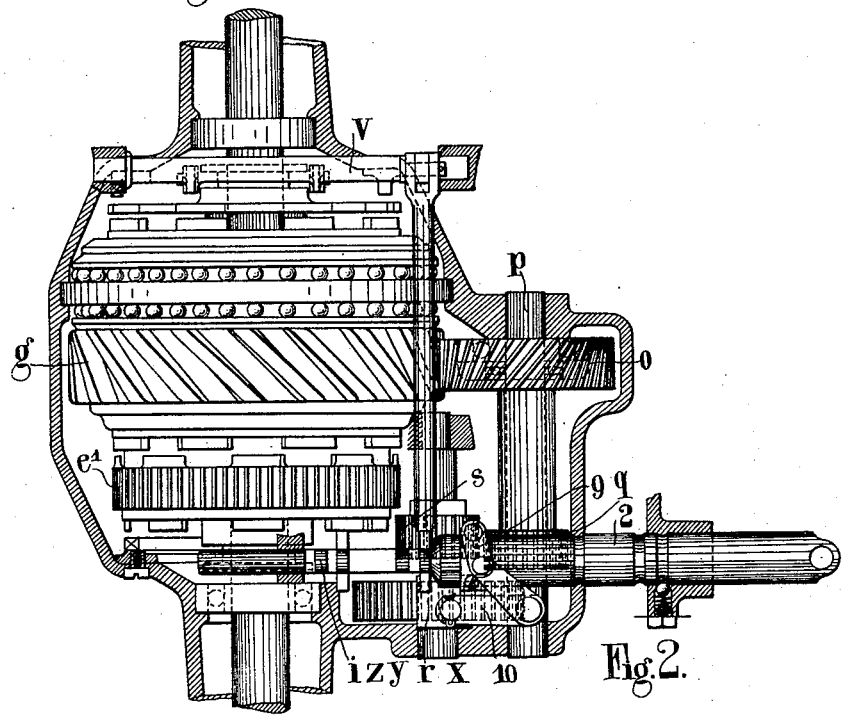
Figure 2 is a part sectional plan on line 2—2 of Fig. 1 with parts removed for clearness.

In carrying my invention into effect in one convenient manner, I arrange a differential box or casing $m$ about the adjacent ends of the two part back axle of the self-propelled vehicle to which the invention is to be applied and a conventional type of differential constituting an operative or compensating connection between the respective axle sections, and in conjunction therewith I provide an epicyclic train of gears a planet-carrier $a$, a sun wheel $b$ and one or more planet wheels $c$, each of the latter being free to rotate upon a pin $d$ secured to or formed in one with the planet-carrier $a$. In addition to the sun and planet wheels, there is also an annular heel or ring $e$, and surrounding these members is the driving sleeve or member $f$ to which is secured or with which is formed a worm wheel $g$ adapted to be actuated by a worm $h$ formed on or secured to the propeller shaft $k$ by which the necessary power is transmitted from the engine or other power unit, a friction clutch or other suitable means (not shown) being provided to throw the engine into or out of gear as is usual in connection with motor vehicles.

The sun wheel $b$ is movable axially upon the axle $l$ so that it may be clutched to the gear casing $m$ or other fixed part or to the driving member $f$ of the gear, and the annular wheel or ring $e$ is also similarly movable so that it also may be clutched to the casing or other fixed part or to the driving member. The ring member $e$ has externally cut teeth as shown at $e'$ as well as the usual internal gear.

In conjunction with such epicyclic train of gears I provide an external train of gears which may, for instance, be actuated by a second worm $n$ upon the propeller shaft $k$ engaging with a worm wheel $o$ on a shaft $p$ having also a pinion $q$ thereon, and this gear is adapted to drive the annular wheel or ring $e$ of the epicyclic train by means of an intermediate slidable gear comprising the pinions $r\ s$ or other suitable device.

The movements of the various movable parts for gear changing may be controlled by means of a single lever $t$ (Figures 4 and 5) provided in conjunction with a gate $u$ of more or less the usual form so constructed as to be capable of giving the endwise movement to the components of the epicyclic train and also to the external gear. This is secured from a series of cams or a combination of links $v\ w$ and cranks or eccentrics $x\ y\ z\ i$ carried on an auxiliary shaft 2 arranged in guides so as to be capable of both endwise and rotary movement, the endwise movement bringing the proper eccentrics into engagement with the links and the rotary movement causing the eccentrics to act on such links so as to slide the components of the epicyclic train as hereinafter described. This combined rotary and endwise movement of the crank shaft 2 is preferably secured through a bell crank 3 (Figures 4 and 5) engaging the hand lever $t$ through the universal link 4 and the shaft 2' through the universal link 4' to give the end sliding and a geared segment 5 on the lever $t$ engages a long pinion 6 on a shaft having a bevel segment 7 engaging a bevel pinion 8 on the shaft 2' to give the rotary movements. The portion shown in Figures 4 and 5 is conveniently placed at the driver's seat and a universal connection of a conventional type from 2' to 2 transmits the movements to this auxiliary shaft.

With such an arrangement as that described, it is possible to obtain four changes in speed and a reverse as follows:—

For the fourth or top speed, both sun wheel and ring are clutched to the driving member so that a direct drive is obtained from the propeller shaft to the differential.

For the third speed, the sun wheel is clutched to the gear box or other fixed member, while the ring or annular wheel is revolved by being clutched to the driving member.

The second speed is obtained by the converse arrangement in which the ring or annular wheel is held fixed while the sun wheel is coupled to the driving member.

The first or slow speed is given by similarly revolving the sun wheel, but instead of holding the ring or annular wheel the external gear is brought into engagement by the longitudinal movement of the shaft 2 by which, through the intermediary of the collar and links 9 and levers 10, the slidable gears $r\ s$ are engaged with $q$ and $e'$. The subsequent rotary movement of the auxiliary shaft 2 through 45° engages the sun wheel with the driving member giving same a forward rotary movement whilst through the external gearing the ring or annular member is given a slow revolving movement in a backward direction, the result of this combination being a slow forward revolution to the differential box and back axle of the car.

For reverse the same external gearing remains in mesh but by the rotary movement of the auxiliary shaft 2 through 90° the sun wheel is released from the driving member and engaged with the fixed casing. The external gear is then the only driver and transmits through the ring member its slow reverse revolution to the differential box and axle of the car.

In the process of making each change of speed it is usual to declutch the engine from the propeller shaft and by so doing a noiseless and smooth change is secured without any special skill being required on the part of the driver, owing to the comparatively slow speed of the members forming this gear.

It will be seen that the gear ratio adopted for the external gearing affects both slow or first speed and the reverse, but in some cases it may be found more convenient to provide separate external gears for various speeds both forward and reverse.

For what is known as the double reduction type axle, usually required for heavy commercial vehicles, a gear in accordance with my invention may be applied by using an intermediate reduction from a shaft carrying the gear to a wheel or wheels upon the back axle or to its differential casing by gearing, chain or other system of transmission.

Figure 6:
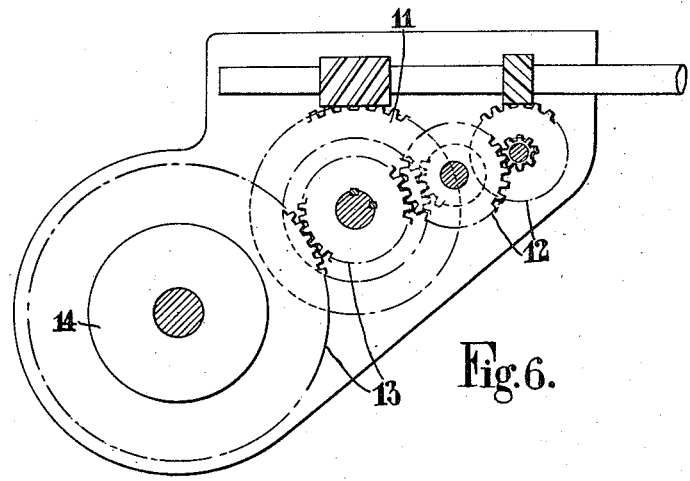
Figures 6 and 7 are views on a smaller scale showing a modified arrangement of gear.
Figure 7:
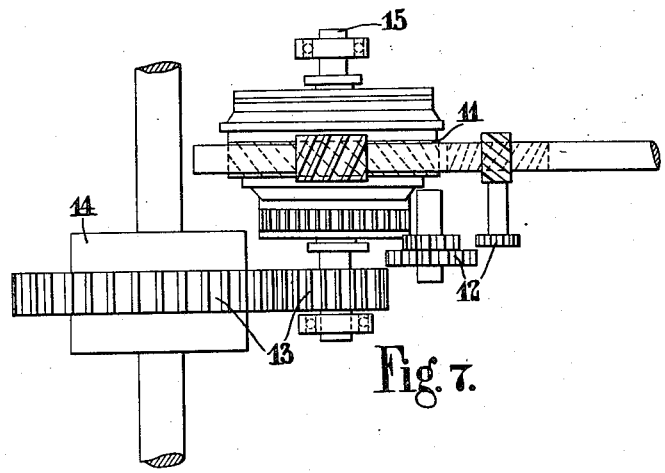

Such an arrangement is shown in Figures 6 and 7, where 11 indicates the gear as above described, a solid block internal to 11 (not shown) keyed on the shaft 15 takes the place of the differential shown in Figure 3, 12 is the external gear, 13 the intermediate reduction gearing, and 14 the differential on the back axle.

Side-chain system of driving may obviously be also employed using the same components herein described as forming parts of the axle, chain sprockets taking the place of road wheels.

It is to be understood that the invention is not to be confined to the foregoing details of construction which are given by way of example only, as I may modify the form and arrangement of my gearing and the component parts thereof to suit the type of vehicle to which the invention is to be applied, and it will also be understood that ball or other thrust bearing may be provided as and where required.

Having now described my invention, what I claim as new and desire to secure by Letters Patent is:—

1. Change speed gear of the character described comprising in combination an encircling driving member, an epicyclic gear arranged internally thereof, and a secondary driving gear external to and independent of the epicyclic gear, said gear being adapted to be engaged with and disengaged from one of the members of the epicyclic train so as to give changes of speed additional to those given by the epicyclic train itself and a reverse, substantially as described.

2. Change speed gear according to claim 1 in which both the primary and secondary driving gears are driven from independent worms mounted upon the same shaft substantially as described.

3. Change speed gear according to claim 1 having a single lever for controlling all the adjustments of the gears substantially as described.

4. A change speed gear of the character described comprising in combination, a main driving member, a two-part driven member, a casing enclosing said members, an epicyclic train of gearing arranged within the casing and operably associated with the driving and driven members and including a sun wheel arranged about one part of the driven member, a planet carrier arranged about the meeting ends of the two-part driven member, planet wheels supported in said carrier and engaged with the sun wheel, an annular ring surrounding said planet wheels mounted on the other part of the two part driven member, an annular driven member surrounding said annular ring and engaged with the main driving member, means on the sun wheel and annular ring and on the casing whereby these movable parts may be brought into engagement so as to rotate or else prevented from rotating, an external gearing adapted to be engaged with or disengaged from the annular ring, and a single operative member for controlling the clutching and declutching of the sun wheel and the annular ring and the engagement and disengagement of said external gearing.

5. An arrangement as claimed in claim 4 wherein the single operative member consists of a slidably and pivotally mounted lever.

6. An arrangement as claimed in claim 4 wherein the member consists of a slidably and pivotally mounted lever and a gate acting in conjunction with the lever for controlling the movement thereof.

7. Change speed gear of the character described comprising in combination, a main driving member, a two-part driven member, an epicyclic train of gearing operatively arranged between the members, and including a sun wheel mounted on one part of the a sun wheel mounted on one part of the driven member, a planet carrier mounted between the two parts of the driven member, a plurality of planet wheels mounted in the carrier and engaged with the sun wheel, an annular ring surrounding said carrier and mounted on the other part of the driven member, an annular driven member surrounding the ring and positively engaged with the main driving member, a casing enclosing said gearing, coacting engaging means on the sun wheel and on the ring and the outer driven member to effect rotation of the parts together, and coacting engaging means on the sun wheel and casing and ring and casing for preventing rotation of parts, external gearing in the casing adapted to be engaged with or disengaged from said annular ring, means for controlling the clutching and declutching of the sun wheel and the annular ring and the engagement and disengagement of said external gearing including a lever, a shaft movable by said lever and capable of both rotary and endwise movement, cams on said shaft, and independent means acted upon by the cams and associated with the sun wheel, ring and external gearing for transmitting movement to these parts so that their operation may be controlled by the said lever.

8. A change speed gear of the character described, comprising in combination a main casing, a two-part driven member having the ends of its parts within the casing, an epicyclic train of gearing operatively arranged about the two-part driven member, external gearing also arranged within the casing and adapted to be engaged with or disengaged from said epicyclic train, a main driving shaft mounted in the said casing, a worm upon said shaft adapted to drive said gearing, and a second worm on said shaft adapted to drive the external gearing, substantially as described.

9. A change speed gear of the character described, comprising in combination a main supporting casing, a driving shaft therein, a two part driven member having the ends of said parts disposed in the casing, an epiclic train of gearing operatively associated with the driving member and disposed about the two-part driven member and including an external driven member in positive engagement with the main driving member, an annular ring on one part of the two-part driven member and arranged within said external driven member, coactive engaging means on the ring and the member whereby the parts may be clutched to rotate together, coacting engaging means on the ring and on the casing whereby the ring may be clutched to the casing and prevented from rotating, a planet carrier about the two-part driven member and within the ring, planet wheels on said carrier, a sun wheel on the other of the two-part driven members, coactive engaging means on the sun wheel and external driven member whereby the parts may be clutched together, means carried by the casing for coacting with the engaging means on the wheel for preventing rotation of the wheel and external gearing within the main casing adapted to be engaged with or disengaged from the ring, substantially as described.

10. An arrangement as claimed in claim 9 wherein the cooperative engaging means consists of teeth provided on the members.

11. Change speed gear of the character described comprising in combination, a main supporting casing, a main driving member therein, a two-part driven member arranged in the casing, an epicylic train of gearing operatively associated with the driving and driven members and including a rotatable external annular driven member positively engaged with the main driving member, an annular ring within the external driven member and operatively associated with one part of the two-part driven member and adapted to be clutched to the external driven member or to the casing, a planet carrier within the ring and about the two-part driven member, planet wheels operatively mounted on the carrier, a sun wheel operatively mounted on the other part of the two-part driven member and adapted to be clutched to the external driven member or to the casing, external gearing within the casing operatively associated with the main driving member and adapted to be clutched to the ring and a single manually operative member for controlling the clutching and declutching of the annular ring and sun wheel and the engagement and disengagement of said external gearing.

12. An arrangement as claimed in claim 11 wherein a gate is associated with the single operative member for controlling the movements thereof.

13. An arrangement as claimed in claim 11 wherein means is employed for transmitting movement from the lever to the various parts and includes a slidably and rotatably mounted shaft upon which the lever is mounted, cams upon said shaft, operatively mounted yokes engageable with the sun wheel, annular ring and external gearing, and link connections associated with the yokes and the cams, substantially as described.

In testimony whereof I have signed my name to this specification.

JOHN HENRY CHAMBERS.